(12) United States Patent
Koh et al.

(10) Patent No.: US 11,442,435 B2
(45) Date of Patent: Sep. 13, 2022

(54) VISUALIZATION SYSTEM

(71) Applicants: KABUSHIKI KAISHA TOSHIBA, Minato-ku (JP); TOSHIBA DIGITAL SOLUTIONS CORPORATION, Kawasaki (JP)

(72) Inventors: Yuen Shyuan Koh, Kita (JP); Yeonsoo Yang, Machida (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 33 days.

(21) Appl. No.: 17/040,198

(22) PCT Filed: Mar. 25, 2019

(86) PCT No.: PCT/JP2019/012546
§ 371 (c)(1),
(2) Date: Sep. 22, 2020

(87) PCT Pub. No.: WO2019/189004
PCT Pub. Date: Oct. 3, 2019

(65) Prior Publication Data
US 2021/0011463 A1    Jan. 14, 2021

(30) Foreign Application Priority Data
Mar. 27, 2018 (JP) .............................. JP2018-060415

(51) Int. Cl.
*G06F 3/0484* (2022.01)
*G05B 19/418* (2006.01)

(52) U.S. Cl.
CPC ....... *G05B 19/4187* (2013.01); *G06F 3/0484* (2013.01)

(58) Field of Classification Search
CPC .................. G06T 2200/24; G05B 2219/32128
See application file for complete search history.

(56) References Cited

U.S. PATENT DOCUMENTS

| | | | |
|---|---|---|---|
| 2015/0097840 | A1 | 4/2015 | Nishimura et al. |
| 2016/0284109 | A1 | 9/2016 | Nishimura et al. |

(Continued)

FOREIGN PATENT DOCUMENTS

| | | | |
|---|---|---|---|
| JP | 9-174392 | A | 7/1997 |
| JP | 11-188583 | A | 7/1999 |

(Continued)

OTHER PUBLICATIONS

International Preliminary Report on Patentability and Written Opinion dated Sep. 29, 2020 in PCT/JP2019/012546 (submitting English translation only), 6 pages.

(Continued)

*Primary Examiner* — Andrew G Yang
(74) *Attorney, Agent, or Firm* — Oblon, McClelland, Maier & Neustadt, L.L.P.

(57) ABSTRACT

A visualization system creates a first time axis associated with a start time of a first process and a second time axis associated with an end time of the first process or a start time of a second process subsequent to the first process such that a perpendicular line to the first time axis extends from a time point on the first time axis and intersects the second time axis at a time point thereon, the time point on the second time axis being after the lapse of a time period since the time point on the first time axis, the time period being determined from a planned value of a processing period of the first process or a planned value of the start time of the second process. The visualization system disposes the time axes associated with respective processes and a line segment, and displays them on a display apparatus.

8 Claims, 11 Drawing Sheets

(56) References Cited

U.S. PATENT DOCUMENTS

2017/0193131 A1     7/2017  Seo et al.
2018/0129991 A1*  5/2018  Takahashi ............ G06T 11/206
2018/0356804 A1  12/2018  Oka et al.

FOREIGN PATENT DOCUMENTS

| JP | 2015-75795 A | 4/2015 | |
|---|---|---|---|
| JP | 2015-108905 A | 6/2015 | |
| JP | 2016-184235 A | 10/2016 | |
| JP | 2017-68816 A | 4/2017 | |
| JP | 2017-91223 A | 5/2017 | |
| WO | WO 2017/017733 A1 | 2/2017 | |
| WO | WO-2018109842 A1 * | 6/2018 | ........... G05B 19/418 |

OTHER PUBLICATIONS

International Search Report dated Jun. 11, 2019 in PCT/JP2019/012546 filed Mar. 25, 2019.

* cited by examiner

FIG.2

(MANUFACTURING LINE PLANNING INFORMATION)

| MANUFACTURING LINE ID | PROCESS ID | PROCESS NAME | PLANNED VALUE OF PROCESSING PERIOD |
|---|---|---|---|
| line1 | P1 | PROCESS 1(15MINUTES) | 00:15:00 |
| line1 | P2 | PROCESS 2(30MINUTES) | 00:30:00 |
| line1 | P3 | PROCESS 3(10MINUTES) | 00:10:00 |
| line1 | P4 | PROCESS 4(15MINUTES) | 00:15:00 |
| line1 | P5 | PROCESS 5(10MINUTES)BRANCHING | 00:10:00 |
| line1 | P6 | PROCESS 6(20MINUTES) | 00:20:00 |

FIG.3

(MANUFACTURING RECORD)

| LOT ID | PROCESS ID | PROCESS 1 | PROCESS 2 | PROCESS 3 | PROCESS 4 | PROCESS 5 | PROCESS 6 |
|---|---|---|---|---|---|---|---|
| R001 | START TIME | 2017/11/2 8:55:00 | 2017/11/2 9:06:00 | 2017/11/2 9:36:00 | .... | .... | .... |
| | END TIME | 2017/11/2 9:05:00 | 2017/11/2 9:36:00 | 2017/11/2 9:46:00 | .... | .... | .... |
| | PROCESSING PERIOD | 0:15:00 | 0:30:00 | 0:10:00 | .... | .... | .... |
| R002 | START TIME | 2017/11/2 9:05:00 | 2017/11/2 9:21:00 | 2017/11/2 9:51:00 | .... | .... | .... |
| | END TIME | 2017/11/2 9:20:00 | 2017/11/2 9:51:00 | 2017/11/2 10:01:00 | .... | .... | .... |
| | PROCESSING PERIOD | 0:15:00 | 0:30:00 | 0:10:00 | .... | .... | .... |
| R003 | START TIME | 2017/11/2 9:20:00 | 2017/11/2 9:36:00 | 2017/11/2 10:06:00 | .... | .... | .... |
| | END TIME | 2017/11/2 9:35:00 | 2017/11/2 10:06:00 | 2017/11/2 10:16:00 | .... | .... | .... |
| | PROCESSING PERIOD | 0:15:00 | 0:30:00 | 0:10:00 | .... | .... | .... |
| .... | .... | .... | .... | .... | .... | .... | .... |

FIG.11
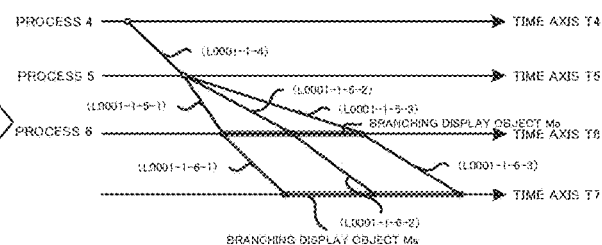
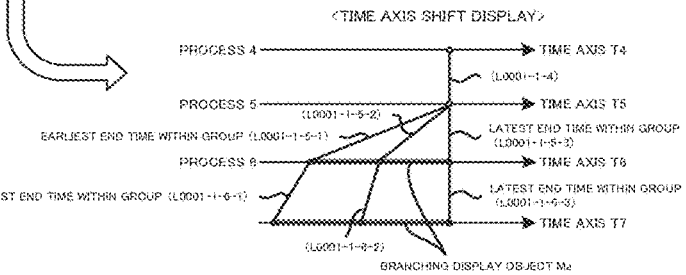
FIG.12
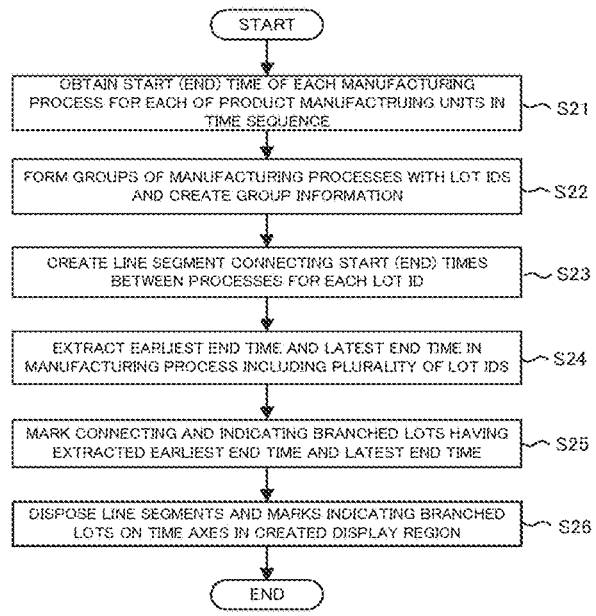

FIG.14
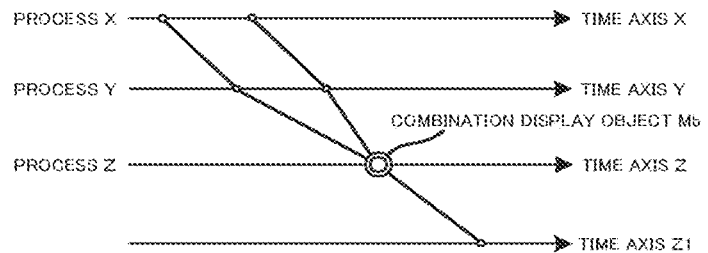
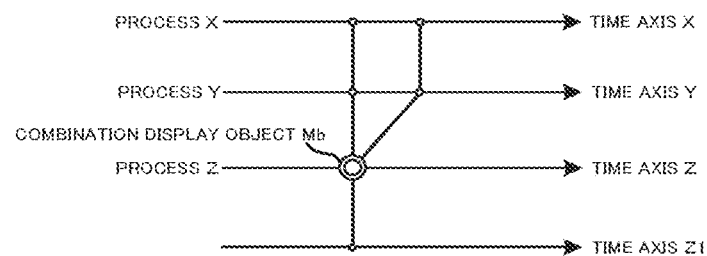
FIG.15
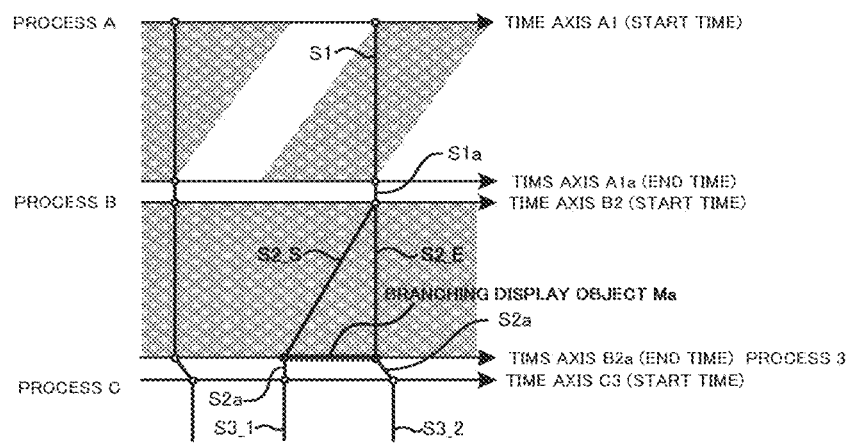

VISUALIZATION SYSTEM

TECHNICAL FIELD

Embodiments of the present invention relate to a technique for visualizing the manufacturing status of a product manufactured through a plurality of processes in order or the processing status of a target.

BACKGROUND ART

Techniques for visualizing the manufacturing status of a product manufactured through a plurality of processes in order have conventionally been used. For example, time axes extending in parallel are associated with a plurality of successive manufacturing processes (manufacturing apparatuses). For each manufacturing unit (lot), the start time or the end time of each manufacturing process is plotted on the time axis of the manufacturing process, and those start times or end times plotted on the time axes arranged in parallel are connected to each other by line segments, thereby allowing visualization of the manufacturing status for each manufacturing unit.

PRIOR ART DOCUMENTS

Patent Documents

[Patent Document 1] Japanese Patent Laid-Open No. 2016-184235
[Patent Document 2] Japanese Patent Laid-Open No. 2015-75795

DISCLOSURE OF THE INVENTION

Problems to be Solved by the Invention

It is an object of the present invention to provide a visualization system capable of visualizing the manufacturing status of a product manufactured through a plurality of manufacturing processes in order or the processing status of a target in a more elaborate manner with an improved representation.

Means for Solving the Problems

According to an embodiment, a visualization system visualizes the manufacturing status of a product manufactured through a plurality of processes in order or the processing status of a target processed through a plurality of processes in order. The visualization system includes: a first creation section configured to create a first time axis associated with a start time of a first process and a second time axis associated with an end time of the first process or a start time of a second process subsequent to the first process such that a perpendicular line to the first time axis parallel to the second time axis extends from a time point on the first time axis and intersects the second time axis at a time point thereon, the time point on the second time axis being after the lapse of a time period since the time point on the first time axis, the time period being determined from a planned value of a processing period of the first process or a planned value of the start time of the second process; a second creation section configured to create a line segment connecting the start time of the first process on the first time axis with the end time of the first process or the start time of the second process on the second time axis for each product manufacturing unit or each target processing unit; and a display control section configured to dispose the time axes associated with the processes and created by the first creation section, to dispose the line segment created by the second creation section, and to display the time axes and the line segment on a display apparatus.

BRIEF DESCRIPTION OF THE DRAWINGS

FIG. 2 A diagram showing a data example of manufacturing line planning information according to Embodiment 1.
FIG. 3 A diagram showing a data example of a manufacturing record according to Embodiment 1.
FIG. 11 A diagram for explaining an example of branched lot visualization processing according to Embodiment 1.
FIG. 12 A flow chart illustrating the branched lot visualization processing according to Embodiment 1.
FIG. 14 A diagram showing an example of combined lot visualization processing according to Embodiment 1.
FIG. 15 A diagram showing an example of visualization to which the visualization processing operations are applied to the time axis shift display according to Embodiment 1.

MODE FOR CARRYING OUT THE INVENTION

An embodiment of the present invention will be described with reference to the accompanying drawings. While a plurality of manufacturing processes are hereinafter described as an example in the following description, the concept of "manufacturing" as used herein also includes a mechanism for obtaining the result from a plurality of processes such as a waste disposal line for changing waste into recyclable waste through a plurality of processes, a garbage disposal line for disposing garbage by burning the garbage in an incinerator, and a printing line for printing newspapers or other materials. In other words, the subject matter of the present invention is not limited to the concept of "product" or "manufacturing" relating to production of objects but encompasses the concept of treating "objects" through a plurality of courses or processes.

Embodiment 1

Figure 1:
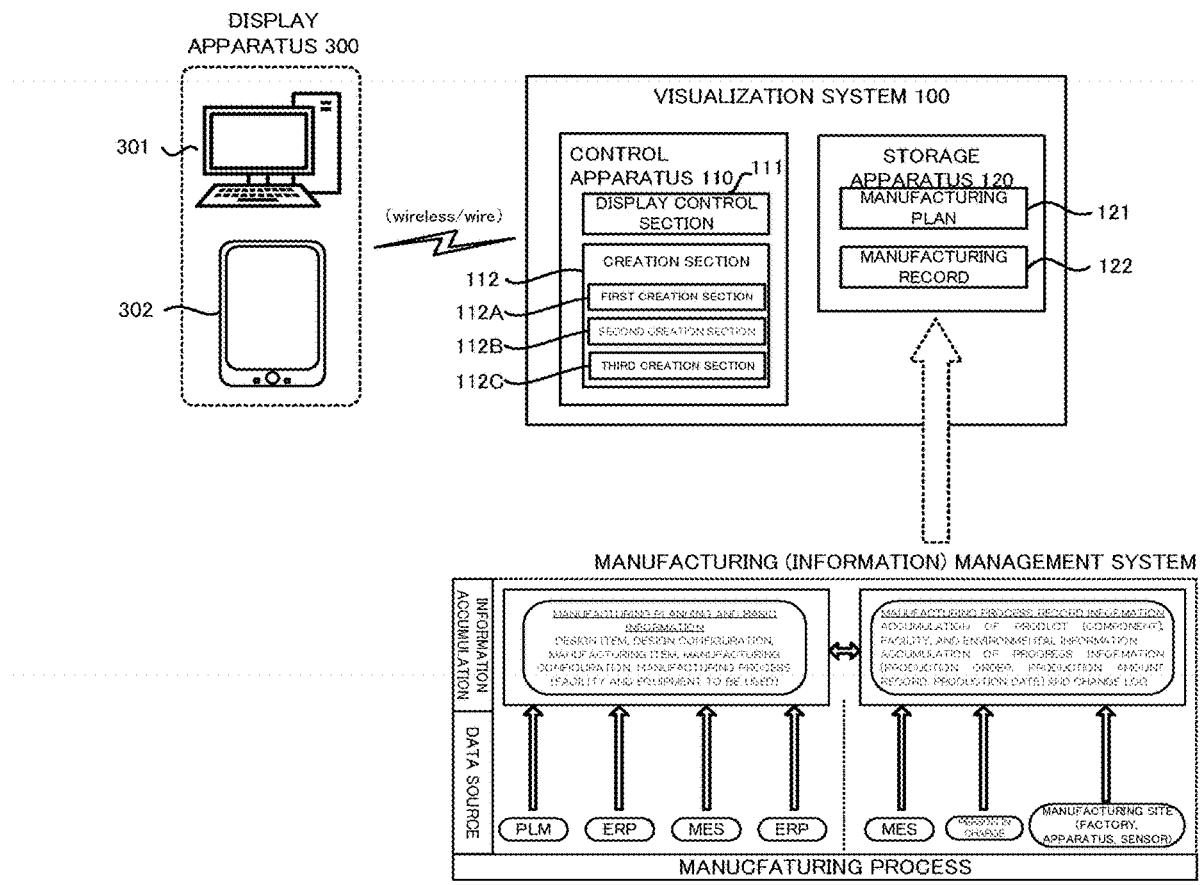
FIG. 1 A block diagram showing the configuration of a visualization system according to Embodiment 1 of the present invention.

FIG. 1 is a diagram showing the configuration of a visualization system 100 according to Embodiment 1 of the present invention. The visualization system 100 is configured to include a control apparatus 110 and a storage apparatus 120, and is connected to a display apparatus 300 over wireless connection or wired connection. The display apparatus 300 is a display terminal including a display device such as a computer 301, a tablet computer 302, a multi-functional cellular phone, or a Personal Digital Assistant (PDA), and can have a data communication function and a computing function (provided by a CPU or the like) as required.

While Embodiment 1 shows an example in which the standalone display apparatus 300 is connected to the visualization system 100, the present invention is not limited thereto. For example, the visualization system 100 can be connected to a display device to configure the visualization system 100 according to Embodiment 1 as a display apparatus including the functions of the visualization system 100. In other words, the visualization system according to Embodiment 1 can be configured as a single display apparatus.

The visualization system 100 according to Embodiment 1 provides a visualization function of visualizing the manufacturing status of a product manufactured through a plurality of manufacturing processes in order and displaying the visualized manufacturing status on the display apparatus 300. The storage apparatus 120 stores information including a manufacturing plan 121 and a manufacturing record 122 for each of the plurality of manufacturing processes.

The various types of information stored in the storage apparatus 120 are supplied from a predetermined manufacturing management system as shown in FIG. 1. The manufacturing management system mainly collects and accumulates, from data sources, various types of information ranging from manufacturing planning and basic information to manufacturing process record information.

It should be noted that various types of information stored in the storage apparatus 120 may be collected and stored directly from data sources without the intervening manufacturing management system. In this case, the control apparatus 110 of the visualization system 100 can have an information processing function of editing and processing the information collected from the data sources into various types of information for use in visualization of the manufacturing status of a product manufactured through a plurality of manufacturing processes in order.

Examples of the manufacturing plan 121 include production planning, information about apparatuses/equipment to be used, planned values of production amount, and planned time schedule values of manufacturing line (including planned values of the processing period, the start time, the end time, and the time schedule of each of processes constituting a manufacturing line). Examples of the manufacturing record 122 include information about products manufactured in manufacturing units (such as the start time, the end time, and the processing period of each of processes constituting a manufacturing line), statuses of facilities in operation, environmental information, inspection results, production amount records, and record values including change histories based on quality control, later described. The manufacturing record 122 can be configured to store information collected from data sources such as facility equipment or sensor equipment used in the manufacturing processes constituting the product manufacturing line and to include sensor values acquired from such sensor equipment.

The start time and the end time of each of the processes for each product manufacturing unit may be the input time to and the output time from each process, respectively. Specifically, the start time and the end time of each of the processes for each product manufacturing unit are the start time and the end time associated with the processing period of the process, and assuming that the processing period of the process starts at its input time and ends at its output time, the input time and the output time correspond to the start time and the end time of the process, respectively.

FIG. 2 is a diagram showing a data example of the manufacturing plan 121 and illustrating manufacturing line planning information. The manufacturing line planning information is planning information about a plurality of manufacturing processes constituting a manufacturing line, and a set of products of the same type serving as a production unit (a product manufacturing unit, or a lot) goes through the plurality of processes. In each process, a processing period for one lot is set as a planned value. For example, in a manufacturing line including processes from a process 1 to a process 6 for manufacturing one product, the planned values of the processing periods of those processes are added up and the resulting sum is the manufacturing period per lot.

FIG. 3 is a diagram showing a data example of the manufacturing record 122. In the manufacturing record 122, a plurality of manufacturing processes constituting a manufacturing line are associated with lot IDs of products going through the manufacturing line, and each of the lot IDs is associated with the start time, the end time, and the processing period (the end time minus the start time) of each process. The manufacturing processes are assigned sequential process IDs in the order of processes based on the manufacturing line planning information shown in FIG. 2.

The lot ID is the number assigned uniquely to each production unit of manufactured products. A plurality of products given the same lot ID are manufactured, and each of the products having the same lot ID is assigned a unique manufacturing number. The lot is a set of products of the same type serving as the production unit, that is, a minimum production unit of products to be manufactured under the same conditions, and one lot contains one or more products. Thus, the visualization system 100 according to Embodiment 1 is applicable not only to the lot but also to a manufacturing unit when the production unit is "one."

The manufacturing record 122 shown in FIG. 3 indicates that the process 1 of products having a lot ID "R001" started at a time "8:55:00" and ended at a time "9:05:00." It is shown that the subsequent process 2 of the products having the lot ID "R001" started at a time "9:06:00" and ended at a time "9:36:00." Products having a lot ID "R002" are input to the process 1 subsequently to the lot ID "R001." It is shown that the process 1 of the products having the lot ID "R002" started at a time "9:05:00" and ended at a time "9:20:00." It is also shown that the subsequent process 2 of the products having the lot ID "R002" started at a time "9:21:00" and ended at a time "9:51:00."

The above example shows that, after the completion of the processing of one manufacturing unit (with the lot ID "R001") in one manufacturing process, the processing of the different manufacturing unit (with the lot ID "R002") started in that manufacturing process. A single manufacturing process may involve a plurality of machines, facilities, or process steps. In such a case, at the time when processing of one manufacturing unit in a first machine, facility, or process step is completed and the manufacturing unit proceeds to processing in a second machine, facility, or process step, processing of a different manufacturing unit is started in the first machine, facility, or process step. In this manner, a plurality of manufacturing units may be processed in parallel within one manufacturing process, as is the case with the process 2 in the example of FIG. 3. In Embodiment 1, one process may involve one machine, facility, or process step, or a plurality of machines, facilities, or process steps. While Embodiment 1 is described in conjunction with the product manufacturing processes, the same mechanism is applicable to operation monitoring including a plurality of monitoring processes, for example.

Figure 4:
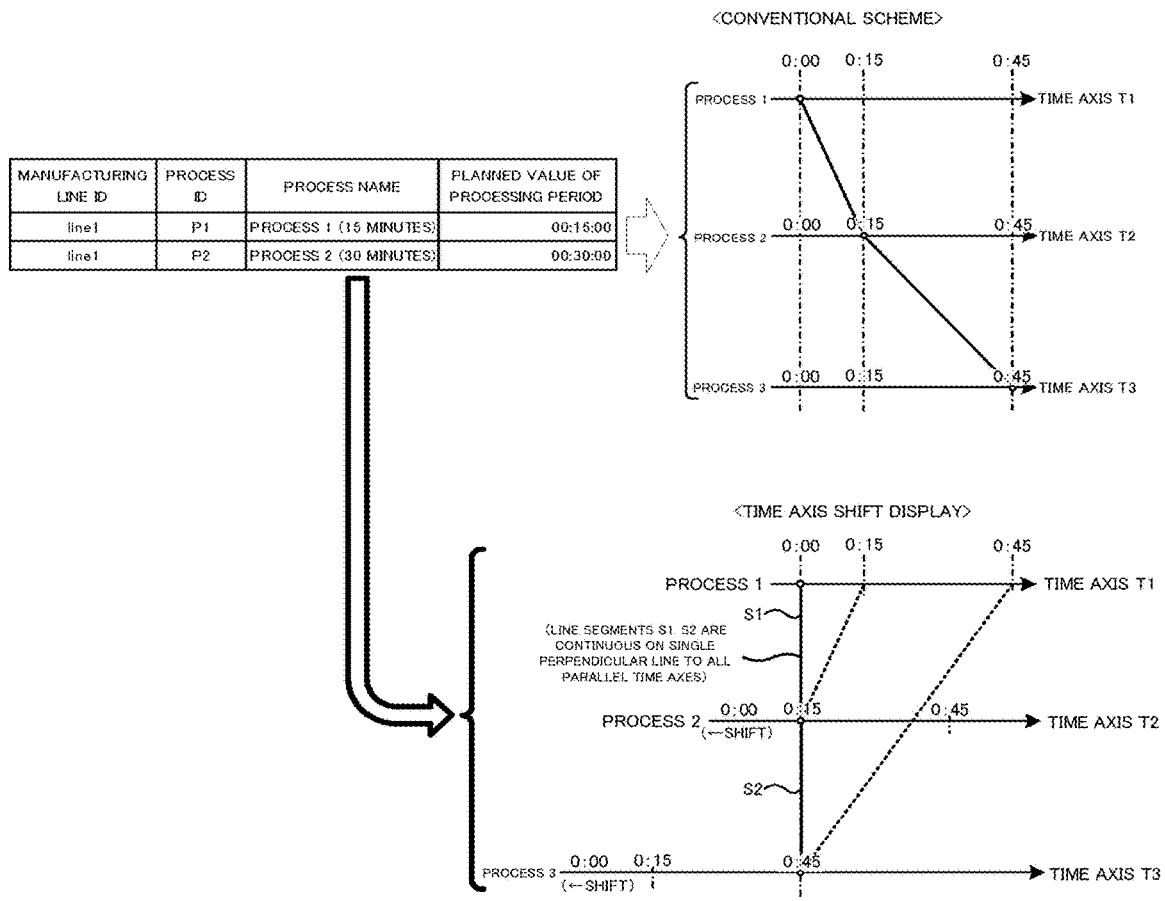
FIG. 4 A diagram for explaining time axis shift display processing according to Embodiment 1.

Next, time axis shift display according to Embodiment 1 is described with reference to FIGS. 4 and 5. FIG. 4 is a diagram for explaining time axis shift display processing according to Embodiment 1.

As shown in FIG. 4, in a conventional scheme, a time axis T1 associated with the start time of the process 1, a time axis T2 associated with the start time of the process 2, and a time axis 3 associated with the start time of a process 3 are set in parallel with predetermined intervals between them, for example. A perpendicular line (chain line) to the time axis T1 extending from a time point thereon intersects the time axes T2 and T3 at the same time point as that on the time axis T1.

Thus, in the conventional scheme, the start time of the process 2 on the time axis T2 is shifted from the start time of the process 1 on the time axis T1 in a time progress direction, and a line segment connecting the time axis T1 with the time axis T2 and representing record values is inclined with respect to the time axes T1, T2. In the conventional scheme described above, when a line segment based on planned values is plotted, the line segment based on the planned values is inclined and thus it is difficult to visually understand any deviation of the record values from the planned values.

To address this, in Embodiment 1, the time axis of a process is arranged with respect to the parallel time axis of the preceding process such that a perpendicular line to the time axis of the preceding process extends from a time point thereon and intersects the time axis of the process at a time point after the lapse of a time period since the time point on the time axis of the preceding process, the time period determined from a planned value of a processing period of the preceding process or a planned value of a start time of the process.

As shown in FIG. 4, it is possible to create a time axis T1 associated with the start time of the process 1 and a time axis T2 associated with the start time of the process 2 subsequent to the process 1 in parallel such that a perpendicular line to the time axis T1 extends from a time point thereon and intersects the time axis T2 at a time point after the lapse of a time period (15 minutes) since the time point on the time axis T1, the time period being determined from the planned value of the processing period of the process 1 or the planned value of the start time of the process 2 in the manufacturing line planning information shown in FIG. 2. In other words, the time axis T2 is shifted from the time axis T1 such that the time point on the time axis T2 at the intersection with the perpendicular line to the parallel time axis T1 is the time point advanced by the time period (15 minutes) determined from the planned value.

Similarly, it is possible to create a time axis T3 of the process 3 subsequent to the process 2 such that a perpendicular line to the parallel time axis T2 extends from a time point thereon and intersects the time axis T3 at a time point after the lapse of a time period (30 minutes) since the time point on the time axis T2, the time period being determined from the planned value of the processing period of the process 2 or the planned value of the start time of the process 3 in the manufacturing line planning information shown in FIG. 2. The time axis T3 of the process 3 is shifted from the time axis T2 such that the time point on the time axis T3 at the intersection with the perpendicular line to the parallel time axis T2 is the time point advanced by the time period (30 minutes) determined from the planned value.

In Embodiment 1, a line segment S1 connecting the time axis T1 with the time axis T2 and representing record values is a perpendicular line to the parallel time axes T1, T2 when the record values match the planned values, and a line segment S2 connecting the time axis T2 with the time axis T3 and representing record values is a perpendicular line to the parallel time axes T2, T3 when the record values match the planned values. Since the time axis T3 is shifted from the time axis T1 by the sum of the planned values of the processes T1, T2, the line segment S1 and the line segment S2 are continuous on a single perpendicular line to the parallel time axes T1, T2, and T3.

Figure 5:
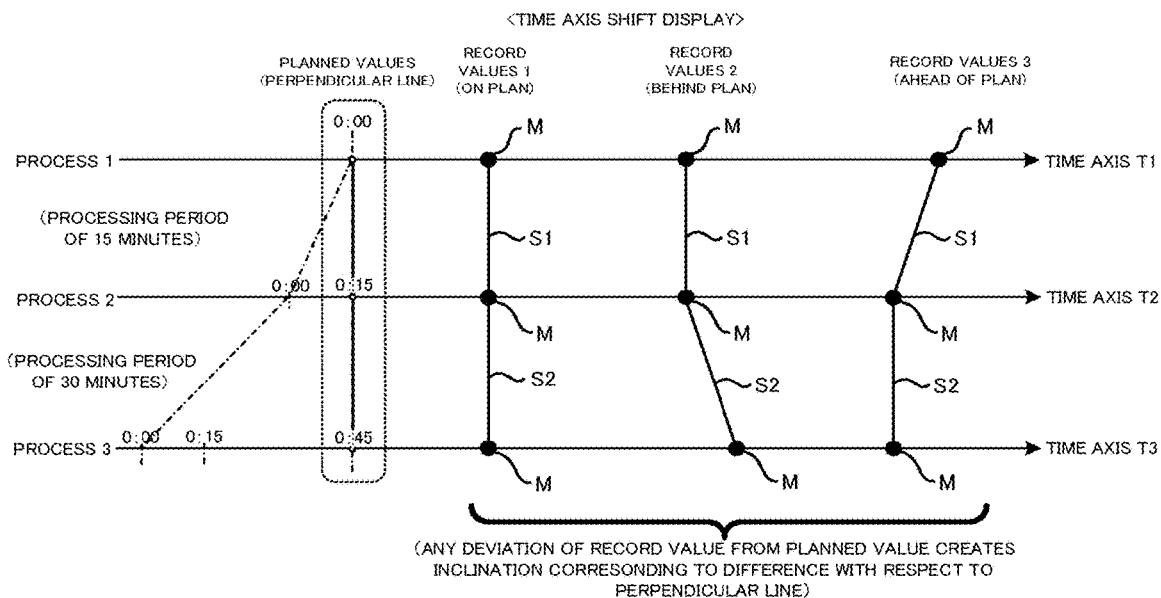
FIG. 5 A diagram showing an example of visualization of a manufacturing status visualized through the time axis shift display processing according to Embodiment 1.

FIG. 5 is a diagram showing an example of visualization of a manufacturing status visualized through the time axis shift display processing according to Embodiment 1. As shown in FIG. 5, line segments based on planned values surrounded by a dotted line are represented by a single perpendicular line to time axes T1, T2, and T3, and when a record value deviates from a planned value, the record value creates an inclination with respect to the perpendicular line that corresponds to a difference from the planned value. For example, line segments S1, S2 representing record values 1 are perpendicular to the time axes T1, T2, and T3 since the record values 1 match the planned values. A line segment S1 representing record values 2 is perpendicular to the time axes T1, T2 since the record values 2 match the planned values, but a line segment S2 is inclined to the right between the time axes T2 and T3 since the processing period of the process 2 finishes behind the planned value. A line segment S2 representing the record values 3 is perpendicular to the time axes T2, T3 since the record values 3 match the planned values, but a line segment S1 is inclined to the left between the time axes T1 and T2 since the processing period of the process 1 finishes ahead of the planned value. A display object M indicates the position of a record value on each time axis and can be disposed at any point on the time axis.

As described above, the time axis shift display processing according to Embodiment 1 is performed in a display range in which the time axis of one process is shifted in advance from the time axis of the preceding process by the time period determined from the planned value of the processing period of the preceding process or of the start time of the one process such that the line segments based on the planned values are perpendicular to the parallel time axes. As a result, any deviation of the record value from the planned value can be visually understood easily from an inclination with respect to the perpendicular line to the parallel time axes.

Particularly, in the conventional scheme, the line segment connecting the time axes has an inclination as described above. When the processes have the same processing period, line segments having the same inclination are disposed on a single straight line. When the processes have different processing periods, however, line segments have different inclinations resulting from the different processing periods of the processes, which makes it impossible to dispose the line segments associated with the processing periods of the processes on a single straight line across the parallel time axes.

In some cases, a plurality of line segments connecting the processes may be disposed on a single straight line. In such a case, however, it is necessary to modify the actual data of manufacturing record according to the processing periods of the processes or to modify the time lapse scales of the time axes (scales in units of time) such that the line segments have the same inclination. In contrast, in the time axis shift display processing according to Embodiment 1, the time axes have the same time lapse scale and the actual data of manufacturing record is used without any modification to create line segments between a plurality of time axes from the actual data with reference to a perpendicular line. Thus, the actual data can be visualized in a more understandable manner through simple processing.

Figure 6:
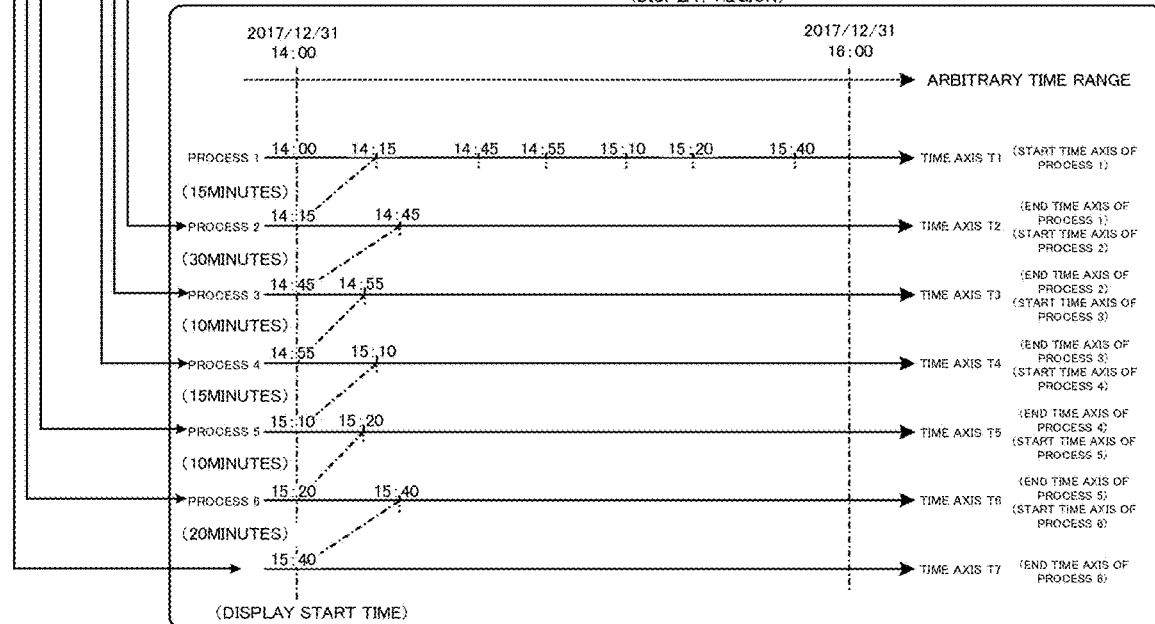
FIG. 6 A diagram showing an example of the time axis shift display processing performed with manufacturing line planning information according to Embodiment 1.
Figure 7:
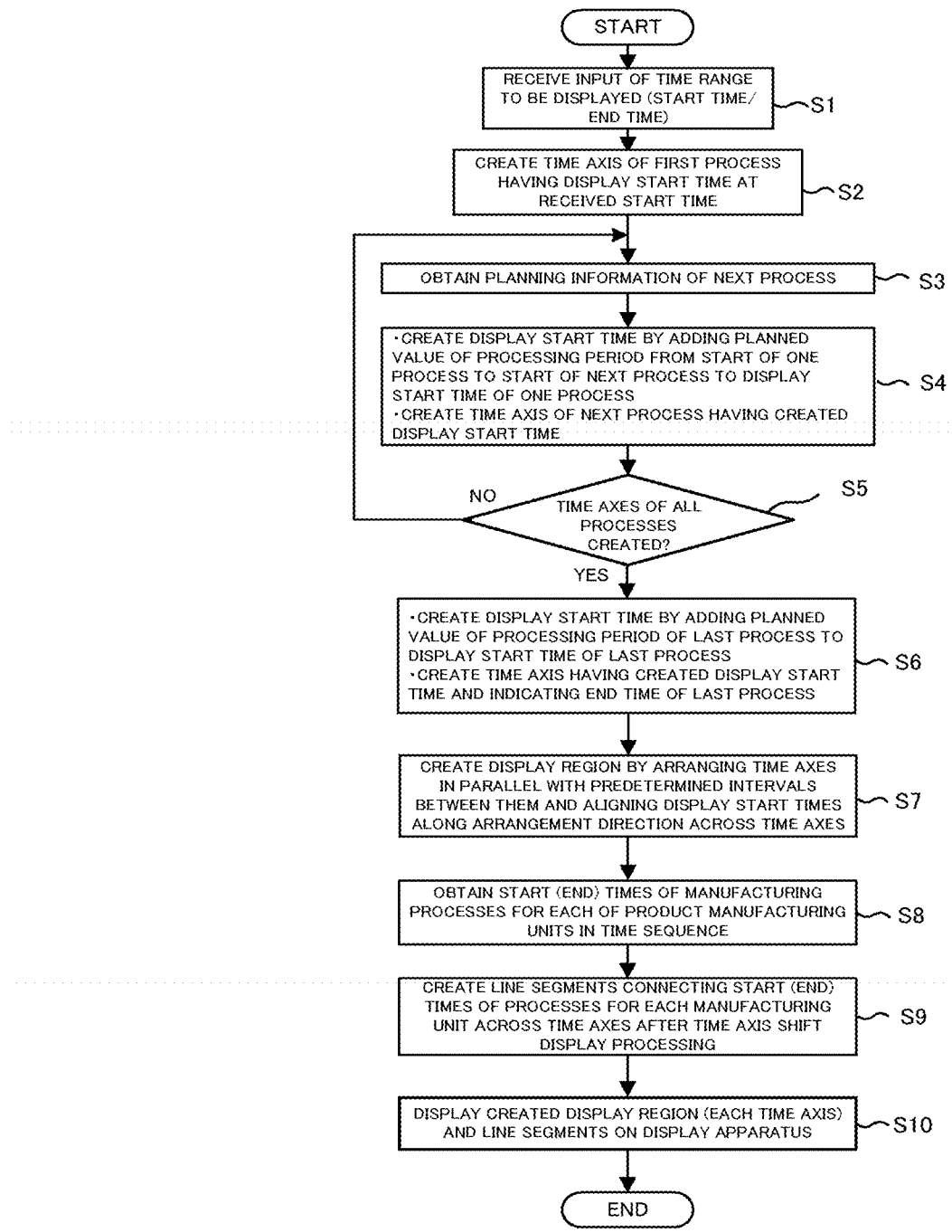
FIG. 7 A flow chart illustrating manufacturing status visualization processing according to Embodiment 1.

FIG. 6 is a diagram showing an example of the time axis shift display processing performed with the manufacturing line planning information according to Embodiment 1. FIG. 7 is a flow chart illustrating manufacturing status visualization processing according to Embodiment 1. Each processing operation according to Embodiment 1 is performed by the control apparatus 110 as shown in FIG. 1. The control apparatus 110 is configured to include a display control section 111 and a creation section 112. The creation section 112 includes a first creation section 112A, a second creation section 112B, and a third creation section 112C.

The control apparatus 110 receives input of a time range (start time/end time) to be displayed on the display apparatus 300 (S1). The time range to be displayed is, for example, an arbitrary time range to know a manufacturing status, or one or a plurality of predetermined time ranges. A user can designate an arbitrary display time range by inputting an arbitrary time range to the visualization system 100 from an input apparatus, not shown, or by selecting from a plurality of time ranges. Alternatively, the visualization processing can be performed in a preset display time range without any user input.

In response to the input of the time range from the user, the creation section 112 performs time axis creation processing. The first creation section 112A obtains the planned values of processing periods of manufacturing processes from the manufacturing line planning information (manufacturing plan 121). While the following description is made in an exemplary aspect in which the processing periods of the manufacturing processes are used, the start times of the manufacturing processes based on the processing periods may be used instead.

As shown in the example of FIG. 6, it is assumed that the display time range extends from 14:00 to 16:00. The first creation section 112A creates a time axis T1 having the received display time range from 14:00 to 16:00 (S2). The time axis T1 has a display start time at the start time (14:00) of the received display time range.

Next, the first creation section 112A obtains the planning information of the next process 2 (S3). The first creation section 112A creates a time axis T2 having a display time range including a display start time (second display time point) calculated by adding a time period corresponding to the planned value of the process 2 to the display start time (first display time point) 14:00 in the received display time range. Specifically, the first creation section 112A creates a display start time (14:15) by adding the planned value (15 minutes) of the processing period from the start of the process 1 to the start of the next process 2 to the display start time (14:00) of the process 1 previous to the process 2. Then, the first creation section 112A creates the time axis T2 of the process 2 having the created display start time (S4).

As shown in FIG. 6, the time axis T2 is created such that a perpendicular line to the parallel time axis T1 extends from a time point on the time axis T1 and intersects the time axis T2 at a time point after the lapse of the time period corresponding to the planned value (15 minutes) of the processing period of the process 1 since the time point on the time axis T1.

The first creation section 112A repeatedly performs operations from step S3 to step S5 to create the time axes of all the processes included in the manufacturing line planning information. For example, the first creation section 112A creates a time axis T3 having a display time range including a display start time 14:45 calculated by adding a time period (30 minutes) corresponding to the planned value of the process 2 to the display start time 14:15 of the process 2, and then creates a time axis T4 having a display time range including a display start time 14:55 calculated by adding a time period (10 minutes) corresponding to the planned value of the process 3 to the display start time 14:45 of the process 2. The first creation section 112A further creates a time axis T5 having a display time range including a display start time 15:10 calculated by adding a time period (15 minutes) corresponding to the planned value of the process 4 to the display start time 14:55 of the process 4, and then creates a time axis T6 having a display time range including a display start time 15:20 calculated by adding a time period (10 minutes) corresponding to the planned value of the process 5 to the display start time 15:10 of the process 5.

When the first creation section 112A creates the time axes T1 to T6 of all the processes (YES at S5), the first creation section 112A creates a time axis T7 associated with an end time of the last process 6 (S6). The first creation section 112A calculates a display start time 15:40 by adding the planned value (20 minutes) of the processing period of the last process 6 to the display start time point 15:20 of the last process 6. The first creation section 112A can create the time axis T7 having the created display start time 15:40 and indicating the end time of the last process 6.

The time axes T1 to T7 extend linearly and have the same time lapse scale (scales in units of time). The first creation section 112A arranges the time axes T1 to T7 in parallel with predetermined intervals between them and aligns the display start times along the arrangement direction across the time axes, thereby creating the display region as shown in FIG. 6 (S7). As described above, the first creation section 112A creates the time axis T2 having the second display start time aligned with the first display start time on the time axis T1 along the direction orthogonal to the parallel time axes, creates the time axis T3 having the third display start time aligned with the second display start time on the time axis T2, and subsequently, creates the time axes T4, T5, T6, and T7 in a similar manner.

Next, the second creation section 112B obtains the start times of the manufacturing processes for each lot ID from the manufacturing record 112 (S8), and creates, in the display region including the time axes T1 to T7 created by the first creation section 112A, a line segment connecting the time axes. Specifically, the second creation section 112B creates a line segment S1 connecting the start time of the process 1 on the time axis T1 of the process 1 with the start time of the process 2 on the time axis T2 shifted from the time axis T1 by the time period corresponding to the planned value of the processing period of the process 1 for each product manufacturing unit (lot). It should be noted that marks (display objects M) indicating the start times may be plotted on the time axes T1, T2 of the processes 1, 2, respectively, and the plotted marks on the time axes T1, T2 may be connected between the processes by a line segment S1, that is, a line segment S1 connecting the start times of the processes 1, 2. The second creation section 112B sequentially creates line segments connecting the start times of the successive processes (S9).

The display control section 111 displays, on the display apparatus 300, the display region (including time axes T1 to T7 associated with the respective processes) created by the first creation section 112A and the line segments created by the second creation section 112B. Specifically, the display control section 111 arranges the time axes T1 to T7 of the manufacturing processes in parallel, disposes the created line segments over the parallel time axes T1 to T7, and displays them on the display apparatus 300.

Figure 8:
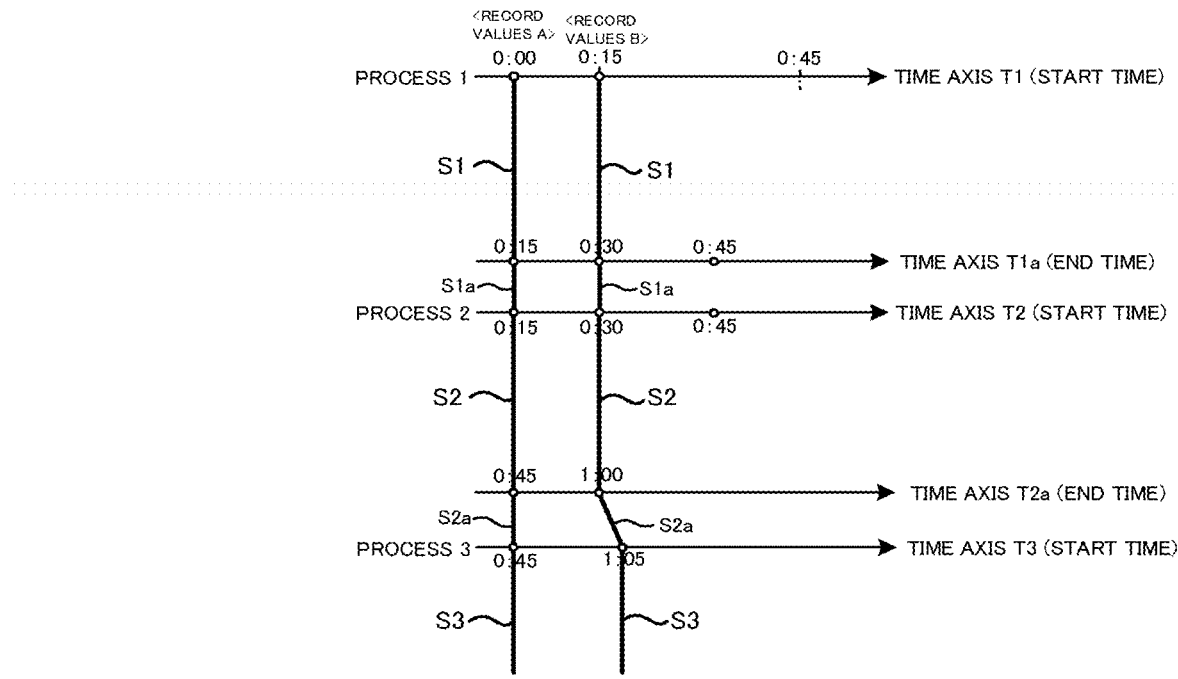
FIG. 8 A diagram for explaining Variation 1 of the time axis shift display processing according to Embodiment 1.

FIG. 8 is a diagram for explaining Variation 1 of the time axis shift display processing according to Embodiment 1. In the above description, the time axes represent the start times of the processes. As shown in FIG. 6, the time axis T2, for example, represents the end time axis indicting the end time of the process 1 and the start time axis indicating the start time of the process 2 on a single time axis.

In contrast, as shown in Variation 1 of FIG. 8, the end time axis indicating the end time of the process 1 can be separated from the start time axis indicating the start time of the process 2 to create the independent time axes. Specifically, the first creation section 112A creates a time axis T1a indicating the end time of the process 1 separately from the time axis T2 indicating the start time of the process 2 in addition to the time axis T1 indicating the start time of the process 1. The time axis T1a can be created as a time axis (corresponding to a second time axis) such that a perpendicular line to the parallel time axis T1 extends from a time point on the time axis T1 and intersects the time axis T1a at a time point after the lapse of a time period corresponding to the planned value of the processing period of the process 1 since the time point on the time axis T1.

Variation 1 shows an example in which the time axis T1a and the time axis T2 are arranged such that the perpendicular line to the parallel time axis T1 extends from the time point on the time axis T1 and intersects the time axes T1a and T2 at the same time point after the lapse of the time period corresponding to the planned value since the time point on the time axis T1. When the end time of the process 1 is identical to the start time of the process 2 as shown in FIG. 8, a line segment S1a (corresponding to a fourth line segment) connecting the time axis T1a with the time axis T2 is a perpendicular line to the time axis T1a.

The same applies to the process 2. A time axis T2a can be created as a time axis (corresponding to a second time axis) such that such that a perpendicular line to the parallel time axis T2 extends from a time point on the time axis T2 and intersects the time axis T2a at a time point after the lapse of a time period corresponding to the planned value of the processing period of the process 2 since the time point on the time axis T2. When the end time of the process 2 is identical to the start time of the process 3, a line segment S2a connecting the time axis T2a with the time axis T3 is a perpendicular line to the time axis T2a.

As shown in FIG. 8, record values B include the end time of the process 2 different from the start time of the process 3, and the process 3 starts after the lapse of a predetermined time since the end of the process 2. In this case, the line segment S2a connecting the time axis T2a with the time axis T3 is not a perpendicular line to the time axis T2a but an inclined line segment. The line segments S1a, S2a are created by the second creation section 112B.

The display control section 111 disposes the time axes T1, T1a, and T2 created by the first creation section 112A and the line segments S1, S2, and S1a created by the second creation section 112B over the positions on the time axes of the processes and displays them on the display apparatus 300.

In Variation 1, even when the end time of the process 1 is different from the start time of the process 2 in the record values, the line segment connecting the start time with the end time of one process is represented as a perpendicular line to the time axis if the processing period matches the planned value. Since the end time of one process and the start time of the next process are represented on the separate time axes, a waiting time between the manufacturing processes can be visually understood easily.

Figure 9:
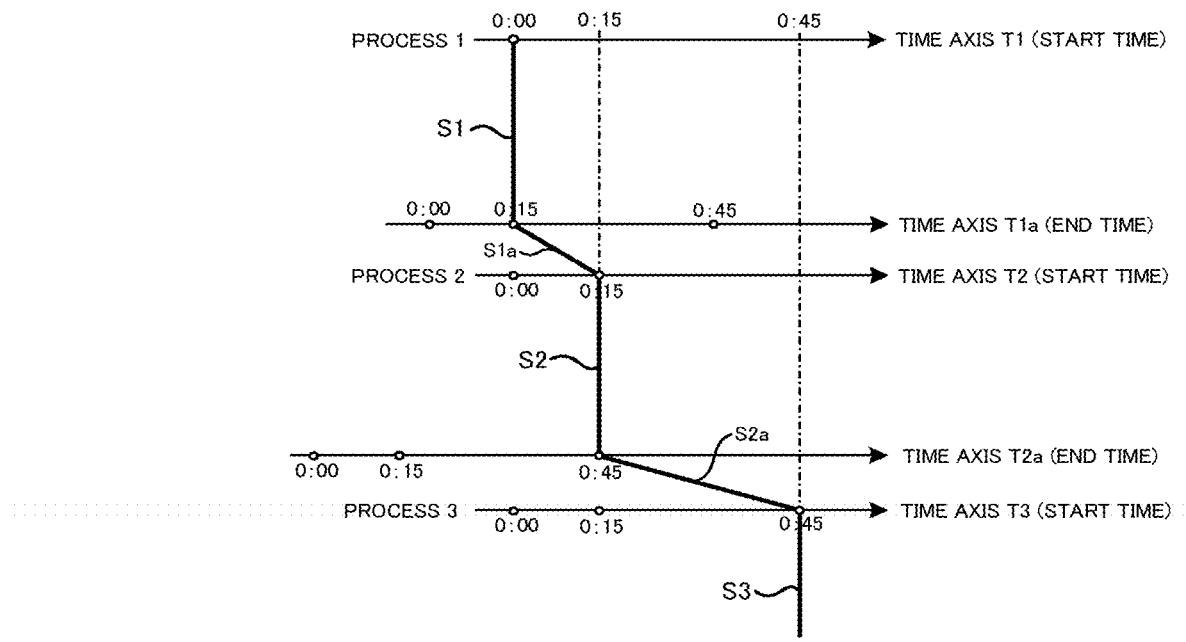
FIG. 9 A diagram for explaining Variation 2 of the time axis shift display processing according to Embodiment 1.

FIG. 9 is a diagram for explaining Variation 2 of the time axis shift display processing according to Embodiment 1. Variation 2 differs from Variation 1 in FIG. 8 in that the time axis T2 indicating the start time of the process 2 is not configured as a time axis shifted from the time axis T1 indicating the start time of the process 1 by the lapse of the time period corresponding to the planned value of the process 1.

Specifically, in Variation 2, only the time axis T1a indicating the end time of the process 1 is created such that a perpendicular line to the parallel time axis T1 extends from a time point on the time axis T1 and intersects the time axis T1a at a time point after the lapse of the time period corresponding to the planned value of the processing period of the process 1 since the time point on the time axis T1, and the time axis T2 indicating the start time of the next process 2 is created such that a perpendicular line to the time axis T1 extends from a time point on the time axis T1 and intersects the time axis T2 at the same time point as the time point on the time axis T1.

As shown in Variation 2 of FIG. 9, only the time axis T1a is created such that the perpendicular line to the parallel time axis T1 extends from the time point on the time axis T1 and intersects the time axis T1a at the time point after the lapse of the time period corresponding to the planned value since the time point on the time axis T1, and a line segment S1a connecting the time axis T1a with the time axis T2 indicating the start time of the process 2 is an inclined line segment even when the end time of the process 1 is identical to the start time of the process 2.

In Variation 2, actual data is used without any modification to create line segments between a plurality of time axes from the actual data with reference to a perpendicular line. Thus, the actual data can be visualized in a more understandable manner through simple processing.

Figure 10:
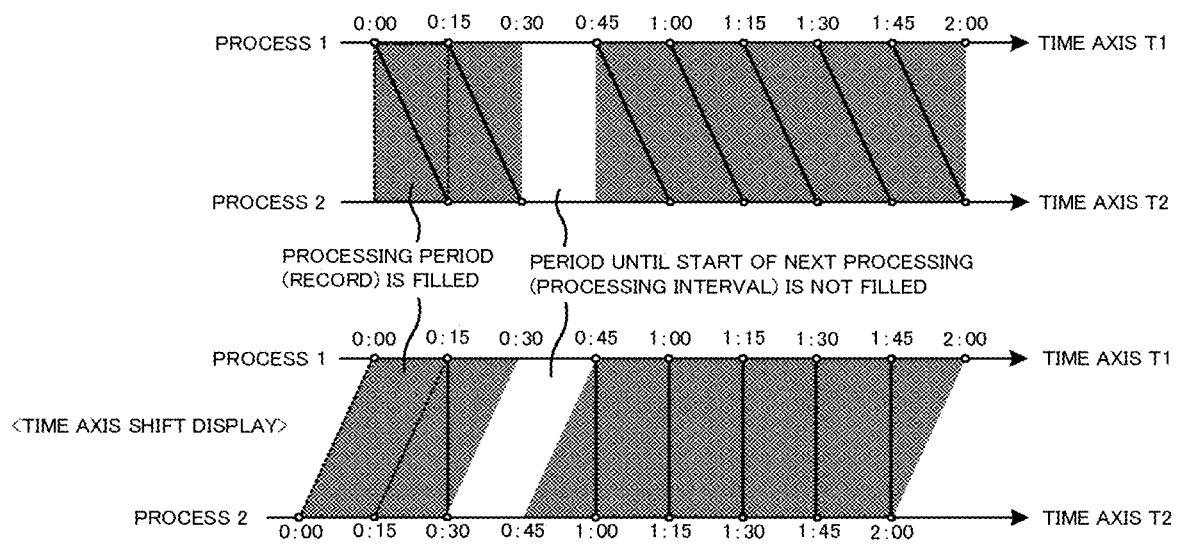
FIG. 10 A diagram for explaining processing interval visualization processing according to Embodiment 1.

FIG. 10 is a diagram for explaining processing interval visualization processing according to Embodiment 1. The processing interval visualization processing is performed by the display control section 111. The processing interval visualization processing includes filling a region between time axes with a color to represent a processing record (processing progress) and not filling a region where no processing was performed, thereby allowing visual recognition of a processing interval (time interval in which no processing was performed) in each process. The upper portion in FIG. 10 shows an example in which this processing is applied to visualization processing with conventional time axes, whereas the lower portion shows an example in which this processing is applied to the time axis shift display processing according to Embodiment 1.

The display control section 111 refers to the manufacturing record 122 to perform display processing of filling, with a predetermined color, a region defined by the start time of the process 1 and the start time of the process 2 on the time axis T1 and the start time and the end time of the process 1 on the time axis T2 for each product manufacturing unit. In the example of FIG. 10, a region surrounded by a dotted line for each lot in the manufacturing record is the filled-in processing period. As shown in FIG. 10, after filling is performed for each lot based on the record values, a region is left unfilled and visually represents that no processing was performed in the process 1. The unfilled region corresponds to a processing waiting period and can be understood as a processing interval. Thus, the exact processing waiting time can be known by visually recognizing the size of the unfilled region. When any unfilled region is not present, it is shown that the process includes no processing waiting period between lots.

In the example of FIG. 10, when the time axis T2 is not shifted from the time axis T1 by the processing period of the process 1, a rectangular region between the parallel time axes corresponds to a processing period per lot. When the time axis T2 is shifted from the time axis T1 by the processing period of the process 1 as a result of the time axis shift display processing, a parallelogram region between the parallel time axes corresponds to a processing period per lot.

FIG. 11 is a diagram for explaining an example of branched lot visualization processing according to Embodiment 1. As shown in FIG. 2, for example, branching processing of branching one lot into a plurality of lots may be performed in the process 5 forming part of the manufacturing line. In this case, as shown in FIG. 11, the manufacturing record 122 manages the branched lots such that one input lot ID is linked to a plurality of output lots ID.

The manufacturing record 122 in the example of FIG. 11 shows an aspect in which one lot is processed through the manufacturing line including the processes from the process 1 to the process 6, the manufacturing record 122 includes histories in those processes (start times/end times), and lot management is performed based on input to and output from one process. For example, the lot ID of a lot input to the process 1 is used as an input lot ID. Upon output from the process 1, the lot is assigned an output lot ID linked to the input lot ID. The output lot ID is used as an input lot ID of the next process, and upon output from the next process, the lot is assigned an output lot ID linked to the input lot ID. In this manner, the lot management is performed.

When a lot having an input lot ID "L0001" is input to the process 1, the lot is given an output lot ID "L0001-1" upon output from the process 1. The output lot ID "L0001-1" is managed as an input lot ID of the process 2. The lot output from the process 2 is given an output lot ID "L0001-1-2." The output lot ID "L0001-1-2" is managed as an input lot ID of the process 3. The lot output from the process 3 is given an output lot ID "L0001-1-3." The output lot ID "L0001-1-3" is managed as an input lot ID of the process 4. The lot output from the process 4 is given an output lot ID "L0001-1-4."

The output lot ID "L0001-1-4" is managed as an input lot ID of the process 5. The process 5 includes the branching processing (for example, processing of dividing one lot into a plurality of lots for separation into a plurality of products or parts). In association with the input lot ID "L0001-1-4," a plurality of lots are output from the process 5 and assigned output lot IDs with branch numbers "L0001-1-5-1," "L0001-1-5-2," and "L0001-1-5-3" for management. The output lot IDs "L0001-1-5-1," "L0001-1-5-2," and "L0001-1-5-3" are managed as input lot IDs of the process 6. The lots output from the process 6 are given output lot IDs "L0001-1-6-1," "L0001-1-6-2," and "L0001-1-6-3."

The manufacturing record 122 can include a lot processing history for managing the branching of a product manufacturing unit in each process. Such branching management manages a parent lot and its child lots linked to each other.

In Embodiment 1, the process in which the branching processing is performed includes creating a display object showing the fact of the branching processing and visualizing the branched lots. As shown in FIG. 1, in the visualization system 100 according to Embodiment 1, the third creation section 112C performs the branched lot visualization processing. FIG. 12 is a flow chart illustrating the branched lot visualization processing.

The third creation section 112C refers to the manufacturing record 122 for the lot management based on input to and output from one process (S21) and forms groups of manufacturing processes with input lot IDs (S22). For example, the third creation section 112C can form groups of processes according to a predetermined numbering system for lot IDs and assign group IDs to the grouped processes in order. Even when one process includes only one input lot ID, the third creation section 112C can assign a group ID and create group information surrounded by a dotted line.

The third creation section 112C creates a line segment connecting time axes between processes for each lot ID (for example, line segment connecting start times) (S23).

The third creation section 112C conducts a search of the groups for each group ID. When two or more branched lots (different output lot IDs) are present in a group, the third creation section 112C identifies a branched lot (corresponding to a first branched lot) having the earliest end time in the process associated with that group or a branched lot having the earliest processing start time of the next process and a branched lot (corresponding to a second branched lot) having the latest end time of the process or a branched lot having the latest processing start time of the next process (S24). In the example of FIG. 11, the process 5 corresponds to the process in which the branching processing is performed, and a group ID "G0005" includes different output lot IDs.

The output lot ID "L0001-1-5-1" is identified as the branched lot having the earliest end time, and the output lot ID "L0001-1-5-3" is identified as the branched lot having the latest end time. The third creation section 112C creates a branching display object Ma for displaying the identified first to second branched lots as a group (S25). For example, the branching display object Ma may be a display object which allows visual distinction of the first to second branched lots from the time axis.

The branching display object Ma may not have a long shape having a length from the first to second branched lots as shown in the example of FIG. 11. For example, distinct marks can be put at the positions of the time points of the first branched lot and the second branched lot. In addition, the process 6 does not include the branching processing, but similar branched lot visualization processing may also be performed in the process subsequent to the branching processing. To prevent reduced visibility due to the branched lot processing representation, a line segment representative of the branched lot processing may be selected from line segments indicating lot processing progress. Thus, the theoretical processing period of the process including the branching in the adjusted time axis range is defined as the processing period necessary for outputting all the output lots associated with one input lot. Specifically, the output lot ID "L0001-1-5-1 and the output lot ID "L0001-1-5-2" are not displayed or displayed with dotted lines if they not selected, and only the output lot ID "L0001-1-5-3" of the branched lot having the latest end time is displayed as a representative.

The display control section 111 disposes the time axes created by the first creation section 112A, the line segments connecting the time axes and created by the second creation section 112 including the line segments associated with the branched lots, and the branching display objects Ma over the positions on the time axes of the processes, and displays them on the display apparatus 300 (S26).

Figure 13:
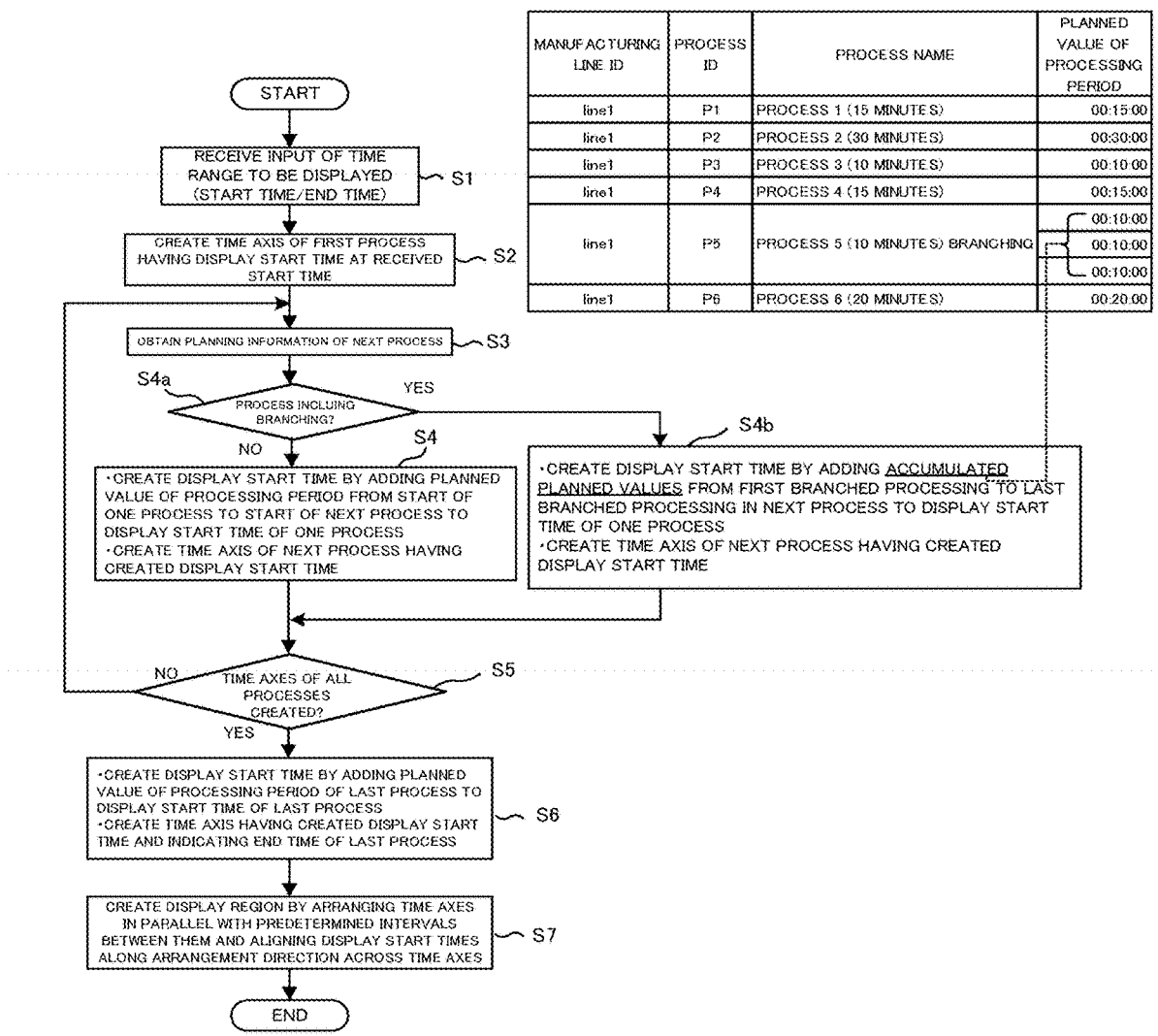
FIG. 13 A flow chart showing the time axis shift display processing performed by taking account of branched lots according to Embodiment 1.

The branched lot visualization processing according to Embodiment 1 is applicable to the time axis shift display processing described above. FIG. 13 is a flowchart illustrating the time axis shift display processing by taking account of the branched lots according to Embodiment 1. In the example of FIG. 13, similar processing operations to those in FIG. 7 are designated with the same reference numerals and detailed description thereof is omitted.

As shown in FIG. 13, the manufacturing line planning information specifies the respective processing periods of the branched lots in the process in which the branching processing is performed. Specifically, when a plurality of branched lots are created from one lot, the processing period of each branched lot is specified, and the time period for completing the processing of all the branched lots associated with the one lot is calculated, for example, by multiplying the processing period of one branched lot by the number of branched lots.

At step S4a, the first creation section 112A determines whether or not the process obtained from the manufacturing line planning information is a process in which branching processing was performed. When it is determined that the process is not the process in which branching processing was performed, the first creation section 112A proceeds to step S4 to perform the time axis creation processing for the time axis shift display processing described above.

At step S4a, when it is determined that the process is the process in which branching processing was performed, the first creation section 112A performs processing at step S4b. Step S4b includes identifying the latest processing end time of the process from the branched lots or the latest processing start time of the next process from the branched lots based on the planned values of the processing periods of the process specified for the branched lots or the planned values of the processing start times of the next process specified for the branched lots output from the process including the branching processing, and creating a time axis (T6) such that a perpendicular line to the parallel time axis (T5) extends from a time point on the time axis (T5) and intersects the time axis (T6) at a time point after the lapse of a time period determined from the identified time since the time point on the time axis (T5).

For example, as shown in FIG. 13, the first creation section 112A creates a display start time of the process S6 by adding the accumulated planned values from the first branched processing to the last branched processing of the process S5 to the display start time of the process S5. The created display start time is the latest processing end time of the branched lots in the process 5, that is, a time point after the lapse of the all the processing periods accumulated from the first branched lot. The first creation section 112A creates the time axis T6 of the process 6 having the created display start time.

With such a configuration, as shown in FIG. 11, the branched lot having the latest end time in the process including the branching processing is visualized with reference to a perpendicular line to the time axis T5, and the other branched lots are visualized as line segments inclined with respect to the time axis T5.

FIG. 14 is a diagram illustrating an example of combined lot visualization processing. While a single lot may be branched into a plurality of lots in the manufacturing line as described above, the opposite may also occur. For example, as shown in the example of FIG. 14, two or more lots independently processed in upstream processes may be combined into one in a downstream process. In this case, a combination display object Mb as shown in FIG. 14 can be displayed for visualization.

Figure 16:
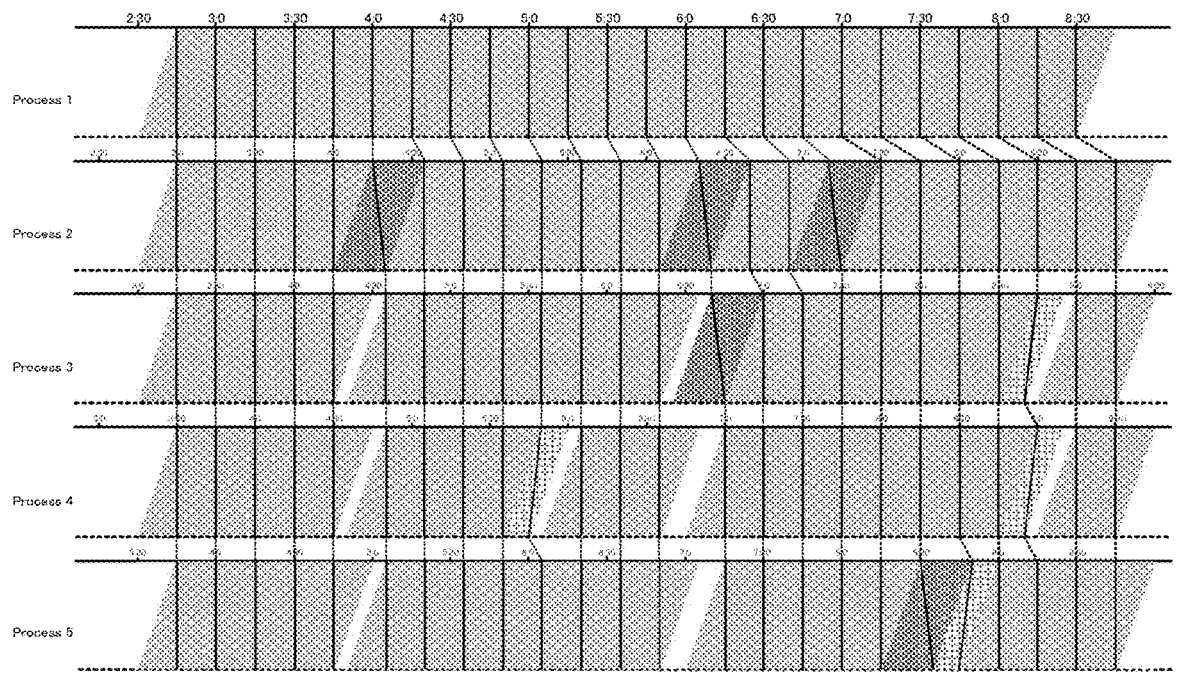
FIG. 16 A diagram showing a status before selection of visualization processing on a display in the time axis shift display according to Embodiment 1.
Figure 17:
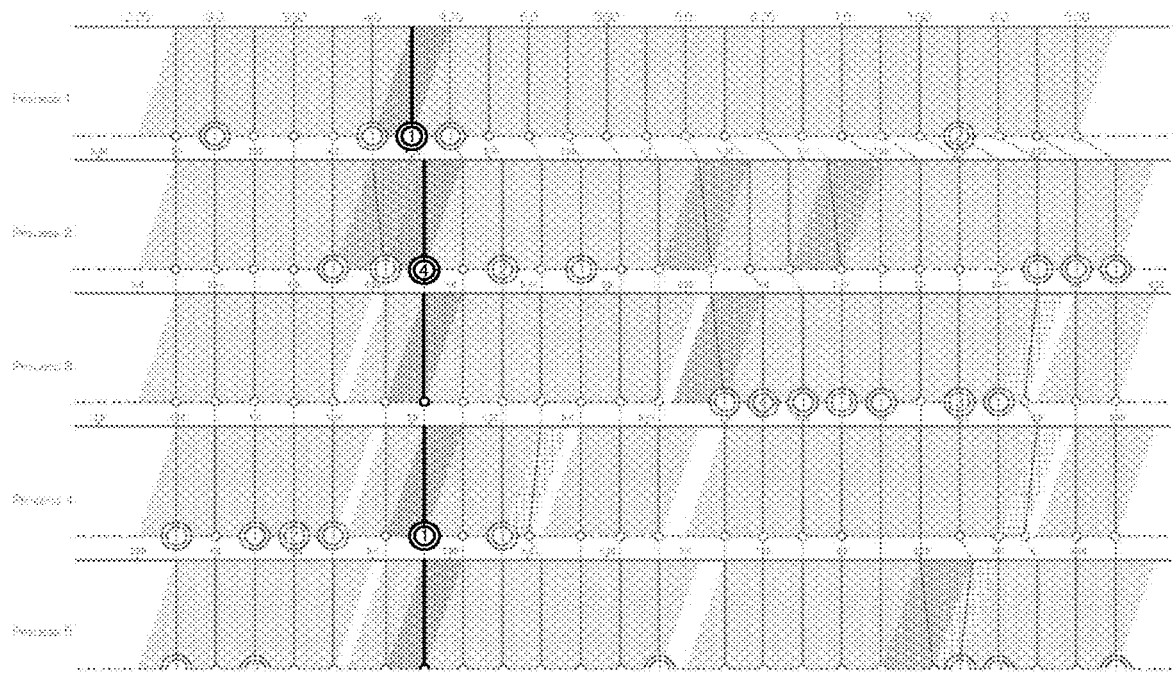
FIG. 17 A diagram showing a status after selection of visualization processing on the display in the time axis shift display according to Embodiment 1.

FIG. 15 is a diagram showing an example of visualization in which the visualization processing operations described above are applied to the time axis shift display according to Embodiment 1. As shown in FIG. 15, the time axis shift display processing allows each line segment connecting the time axes of processes to be visualized with reference to a perpendicular line to the time axes, and achieves, through simple processing, easy-to-understand visualization of the processing interval with the filling processing, the waiting time between processes, and the branched lots. In addition, when visualization processing is selected on a screen shown in FIG. 16 (before selection), information about lot processing associated with the selected region can be identified as shown in FIG. 17 (after selection).

While Embodiment 1 has so far been described, the functions of the component constituting the visualization system 100 described above can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to allow a computer to perform the function of each component in the present invention.

The program may be recorded on a computer readable recording medium and provided for the computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium.

While the embodiment of the present invention has been described, the embodiment is only illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 VISUALIZATION SYSTEM
110 CONTROL APPARATUS
111 DISPLAY CONTROL SECTION
112 CREATION SECTION

112A FIRST CREATION SECTION
112B SECOND CREATION SECTION
112C THIRD CREATION SECTION
120 STORAGE APPARATUS
121 MANUFACTURING PLAN
122 MANUFACTURING RECORD
300 DISPLAY APPARATUS
M, Ma, Mb DISPLAY OBJECT
T TIME AXIS
S1, S2, S3, S1a, S2a LINE SEGMENT

The invention claimed is:

1. A visualization system for visualizing a manufacturing status of a product manufactured through a plurality of processes in order or a processing status of a target processed through a plurality of processes in order, comprising:
a first creation processor configured to create a first time axis associated with a start time of a first process and a second time axis associated with an end time of the first process or a start time of a second process subsequent to the first process such that a perpendicular line to the first time axis parallel to the second time axis extends from a time point on the first time axis and intersects the second time axis at a time point thereon, the time point on the second time axis being after the lapse of a time period since the time point on the first time axis, the time period being determined from a planned value of a processing period of the first process or a planned value of the start time of the second process;
a second creation processor configured to create at least one line segment connecting the start time of the first process on the first time axis with the end time of the first process or the start time of the second process on the second time axis for each product manufacturing unit or each target processing unit; and
a display control processor configured to dispose the time axes associated with the respective processes and created by the first creation processor, to dispose the line segment created by the second creation processor, and to display the time axes and the line segment on a display apparatus,
wherein the first creation processor is configured to create the first time axis, the second time axis associated with the start time of the second process, and a third time axis associated with a start tune of a third process subsequent to the second process such that a perpendicular line to the second time axis extends from a time point on the second time axis and intersects the third time axis at a time point thereon, the time point on the third time axis being after the lapse of a time period since the time point on the second time axis, the time period being determined from a planned value of a processing period of the second process or a planned value of the start time of the third process,
the second creation processor is configured to create, for each product manufacturing unit or each target processing unit, a first line segment connecting the start time of the first process on the first time axis with the start time of the second process on the second time axis, and a second line segment connecting the start time of the second process on the second time axis with the start time of the third process on the third time axis, and
the first line segment and the second line segment are disposed on a single perpendicular line to the first time axis, the second time axis, and the third time axis arranged in parallel when the start times of the processes are identical to the planned values.

2. The visualization system according to claim 1, wherein the first creation processor is configured:
to create the first time axis having an input or preset display time range and the second time axis having a display time range including a second display start time, the second display start time being calculated by adding the time period determined from the planned value to a first display start time within the display time range; and
to create the second time axis such that the second display start time on the second time axis is aligned with the first display start time on the first time axis in a direction orthogonal to the first time axis and the second time axis arranged in parallel.

3. The visualization system according to claim 1, further comprising a third creation processor configured to group branched lots divided in the first process based on a lot processing history for managing branching of a product manufacturing unit or a target processing unit in each process, to identify, from the grouped branched lots, a first branched lot having an earliest end time of the first process or an earliest processing start time of the second process and a second branched lot having a latest end time of the first process or a latest processing start time of the second process, and to create a display object for displaying the identified first to second branched lots as a group,
wherein the display control processor is configured to dispose the time axes created by the first creation processor, the line segments created by the second creation processor and associated with the respective branched lots divided in the first process, and the display object over positions on the time axes of the processes, and to display the time axes, the line segments, and the display object on the display apparatus.

4. The visualization system according to claim 1, wherein the display control processor is configured to perform display processing of filling a region between the first time axis and the second time axis with a predetermined color for each product manufacturing unit or each target processing unit, the region being defined by the start time of the first process and the end time of the first process or the start time of the second process on the first time axis and the start time of the first process and the end time of the first process or the start time of the second process on the second time axis.

5. The visualization system according to claim 1, wherein the first creation processor is configured to create the first time axis, the second time axis associated with the end time of the first process, and a third time axis associated with the start time of the second process,
the second creation processor is configured to create, for each product manufacturing unit or each target processing unit, a third line segment connecting the start time of the first process on the first time axis with the end time of the first process on the second time axis, and a fourth line segment connecting the end time of the first process on the second time axis with the start time of the second process on the third time axis, and
the display control processor is configured to dispose the time axes created by the first creation processor and the third line segment and the fourth line segment created by the second creation processor over positions on the time axes of the processes and to display the time axes and the third and fourth line segments on the display apparatus.

6. A visualization system for visualizing a manufacturing status of a product manufactured through a plurality of processes in order or a processing status of a target processed through a plurality of processes in order, comprising:
a first creation processor configured to create a first time axis associated with a start time of a first process and a second time axis associated with an end time of the first process or a start time of a second process subsequent to the first process such that a perpendicular line to the first time axis parallel to the second time axis extends from a time point on the first time axis and intersects the second time axis at a time point thereon, the time point on the second time axis being after the lapse of a time period since the time point on the first time axis, the time period being determined from a planned value of a processing period of the first process or a planned value of the start time of the second process;
a second creation processor configured to create at least one line segment connecting the start time of the first process on the first time axis with the end time of the first process or the start time of the second process on the second time axis for each product manufacturing unit or each target processing unit;
a display control processor configured to dispose the time axes associated with the respective processes and created by the first creation processor, to dispose the line segment created by the second creation processor, and to display the time axes and the line segment on a display apparatus; and
a third creation processor configured to group branched lots divided in the first process based on a lot processing history for managing branching of a product manufacturing unit or a target processing unit in each process, to identify, from the grouped branched lots, a first branched lot having an earliest end time of the first process or an earliest processing start time of the second process and a second branched lot having a latest end time of the first process or a latest processing start time of the second process, and to create a display object for displaying the identified first to second branched lots as a group,
wherein the display control processor is configured to dispose the time axes created by the first creation processor, the line segments created by the second creation processor and associated with the respective branched lots divided in the first process, and the display object over positions on the time axes of the processes, and to display the time axes, the line segments, and the display object on the display apparatus,
wherein the first creation processor is configured to identify a latest processing end time of the first process from the branched lots or a latest processing start time of the second process from the branched lots based on planned values of processing periods of the first process specified for the branched lots or planned values of processing start times of the second process specified for the branched lots output from the first process and to create the second time axis such that a perpendicular line to the parallel first time axis extends from a time point on the first time axis and intersects the second time axis at a time point after the lapse of a time period since the time point on the first time axis, the time period being determined from the identified time.

7. A display apparatus for displaying a manufacturing status of a product manufactured through a plurality of processes in order or a processing status of a target processed through a plurality of processes in order, comprising:
a first creation processor configured to create a first time axis associated with a start time of a first process and a second time axis associated with an end time of the first process or a start time of a second process subsequent to the first process such that a perpendicular line to the first time axis extends from a time point on the first time axis and intersects the second time axis at a time point thereon, the time point on the second time axis being after the lapse of a time period since the time point on the first time axis, the time period being determined from a planned value of a processing period of the first process or a planned value of the start time of the second process;
a second creation processor configured to create a line segment connecting the start time of the first process on the first time axis with the end time of the first process or the start time of the second process on the second time axis for each product manufacturing unit or each target processing unit; and
a display control processor configured to dispose the time axes associated with the respective manufacturing processes and created by the first creation processor in parallel, to dispose the line segment created by the second creation processor, and to display the time axes and the line segment on the display apparatus,
wherein the first creation processor is configured to create the first time axis, the second time axis associated with the start time of the second process, and a third time axis associated with a start time of a third process subsequent to the second process such that a perpendicular line to the second time axis extends from a time point on the second time axis and intersects the third time axis at a time point thereon, the time point on the third time axis being after the lapse of a time period since the time point on the second time axis, the time period being determined from a planned value of a processing period of the second process or a planned value of the start time of the third process,
the second creation processor is configured to create, for each product manufacturing unit or each target processing unit, a first line segment connecting the start time of the first process on the first time axis with the start time of the second process on the second time axis, and a second line segment connecting the start time of the second process on the second time axis with the start time of the third process on the third time axis, and
the first line segment and the second line segment are disposed on a single perpendicular line to the first time axis, the second time axis, and the third time axis arranged in parallel when the start times of the processes are identical to the planned values.

8. A non-transitory computer readable medium including a computer executable program for visualizing a manufacturing status of a product manufactured through a plurality of processes in order or a processing status of a target processed through a plurality of processes in order, the program comprising instructions which, when executed by a computer, cause the computer to perform:
first processing of creating a first time axis associated with a start time of a first process and a second time axis associated with an end time of the first process or a start time of a second process subsequent to the first process such that a perpendicular line to the first time axis extends from a time point on the first time axis and intersects the second time axis at a time point thereon, the time point on the second time axis being after the lapse of a time period since the time point on the first time axis, the time period being determined from a planned value of a processing period of the first process or a planned value of the start time of the second process;

second processing of creating a line segment connecting the start time of the first process on the first time axis with the end time of the first process or the start time of the second process on the second time axis for each product manufacturing unit or each target processing unit; and third processing of disposing the time axes associated with the respective manufacturing processes and created by the first processing in parallel, to dispose the line segment created by the second processing, and to display the time axes and the line segment on a display apparatus, wherein the first processing is configured to create the first time axis, the second time axis associated with the start time of the second process, and a third time axis associated with a start time of a third process subsequent to the second process such that a perpendicular line to the second time axis extends from a time point on the second time axis and intersects the third time axis at a time point thereon, the time point on the third time axis being after the lapse of a time period since the time point on the second time axis, the time period being determined from a planned value of a processing period of the second process or a planned value of the start time of the third process, the second processing is configured to create, for each product manufacturing unit or each target processing unit, a first line segment connecting the start time of the first process on the first time axis with the start time of the second process on the second time axis, and second line segment connecting the start time of the second process on the second time axis with the start time of the third process on the third time axis, and the first line segment and the second line segment are disposed on a single perpendicular line to the first time axis, the second time axis and the third time axis arranged in parallel when the start times of the processes are identical to the planned values.

* * * * *